Feb. 27, 1968   J. A. MAS   3,371,302
POWER SUPPLY AND IMPROVED TRANSFORMER STRUCTURE THEREFOR
Filed April 23, 1965   2 Sheets-Sheet 1

INVENTOR
JOSEPH A. MAS
BY
ATTORNEY

Feb. 27, 1968    J. A. MAS    3,371,302
POWER SUPPLY AND IMPROVED TRANSFORMER STRUCTURE THEREFOR
Filed April 23, 1965    2 Sheets-Sheet 2
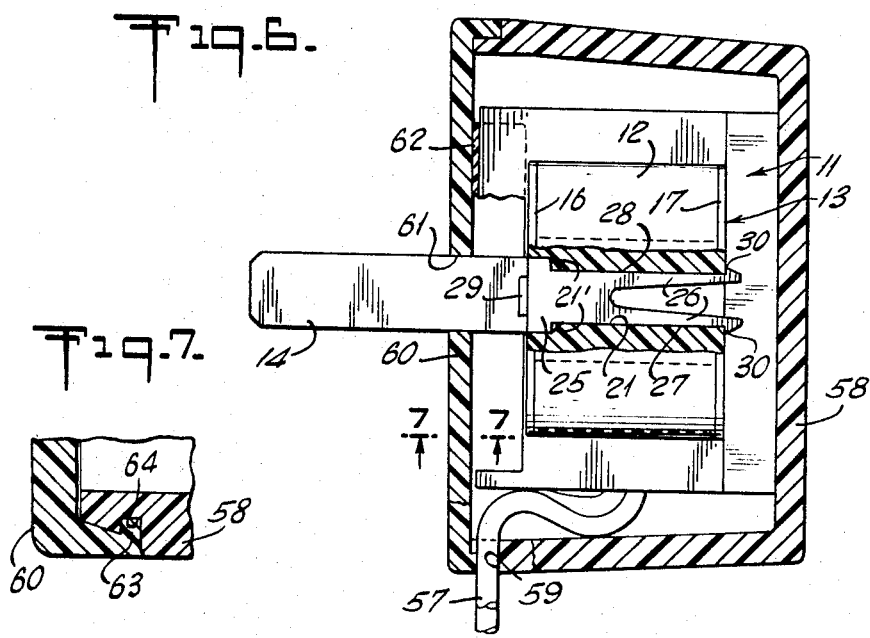
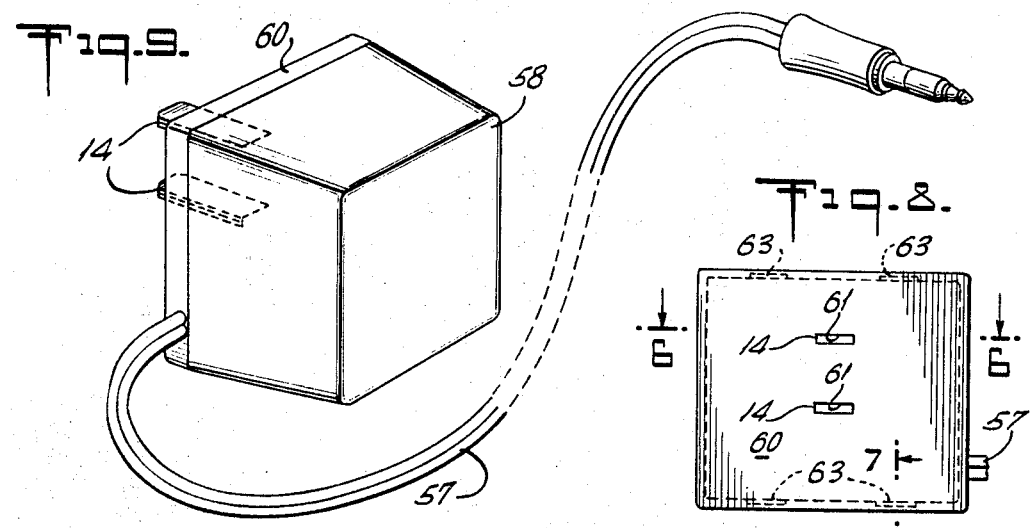
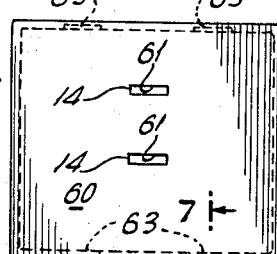
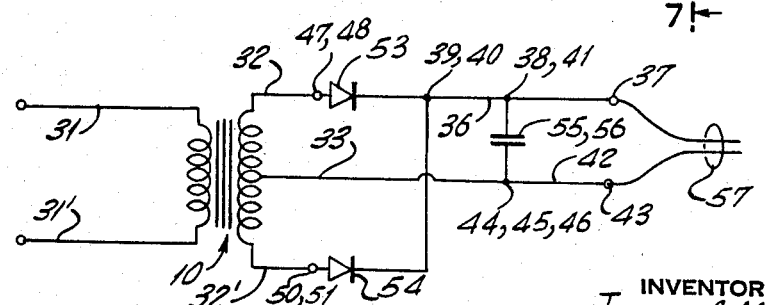
INVENTOR
JOSEPH A. MAS
BY
ATTORNEY

United States Patent Office 3,371,302
Patented Feb. 27, 1968

3,371,302
POWER SUPPLY AND IMPROVED TRANSFORMER STRUCTURE THEREFOR
Joseph A. Mas, Woodbury, N.Y., assignor to Dynamic Instrument Corporation, Plainview, N.Y., a corporation of New York
Filed Apr. 23, 1965, Ser. No. 450,357
7 Claims. (Cl. 336—92)

ABSTRACT OF THE DISCLOSURE

A transformer and coil construction therefor wherein the coil construction includes a spool having rigid prongs engaging the spool and extending therefrom for supporting and energizing the completed transformer.

---

This invention relates to a power supply and more specifically to a novel and improved transformer structure and terminal arrangements therefor particularly advantageous for use in connection with miniaturized power supplies for conversion of alternating current to direct current.

While a transformer structure in accordance with the invention is useful in a wide variety of applications, its use is particularly advantageous in connection with transformers employed in small power supplies of the type adapted to be plugged into an electrical outlet to provide a source of low voltage direct or alternating current. By reason of the novel and improved arrangement of elements including the improved terminal arrangement, the prongs which are intended to be inserted into a conventional alternating current outlet are firmly engaged with the transformer coil so that the basic support for the completed unit is effected by the prongs and the transformer itself. In this way, the surrounding case merely functions to enclose and protect the components and is not required to provide any support for the unit.

Another object of the invention resides in the provision of a novel and improved transformer coil construction embodying means for fixedly retaining cooperating prongs after the coil has been wound, said prongs, upon installation of the magnetic core material, being adapted to engage a cooperating socket for the support of the transformer independent of any housing in which it may be enclosed and for energization of the transformer.

A still further object of the invention resides in a novel and improved coil form for transformers and cooperating prongs for engagement with the coil form.

A still further object of the invention resides in the provision of a novel and improved power supply structure having prongs extending therefrom for insertion in an electric outlet and producing a relatively low voltage output.

The above and other objects and advantages of the invention will become more apparent from the following description and accompanying drawings forming part of this application.

In the drawings:

FIGURE 6 is a cross-sectional view of a completed power supply taken along the line 6—6 of FIGURE 8.

FIGURE 7 is a cross-sectional view of FIGURES 6 and 8 taken along the lines 7—7 thereof.

FIGURE 8 is a bottom view of the completed power supply in accordance with the invention.

FIGURE 9 is a perspective view of the power supply of FIGURES 6 and 8.

FIGURE 10 is a circuit diagram of the completed power supply.

The power supply in accordance with the invention embodies a transformer and may include suitable rectifying and filtering apparatus to rectify the transformer output and produce a DC voltage. The improved transformer includes a coil form for retaining the transformer windings and having means therein for the attachment of cooperating prongs in predetermined spaced relationship so that the prongs can be inserted into a socket such as an electrical outlet for energizing the primary of the transformer and at the same time providing support for the completed transformer. With this arrangement, a surrounding housing on the transformer need only afford mechanical protection for the transformer and any other components that may be utilized within the housing and need not function to furnish support for the transformer and other components. Thus, the improved arrangement and organization of elements enables the production of a power supply which is sturdy, dependable and can be assembled at relatively low cost.

Figure 1:
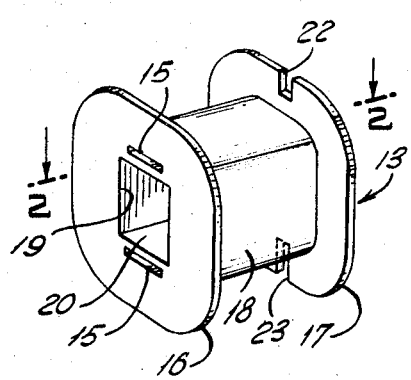
FIGURE 1 is a perspective view of an improved coil form in accordance with the invention.
Figure 2:
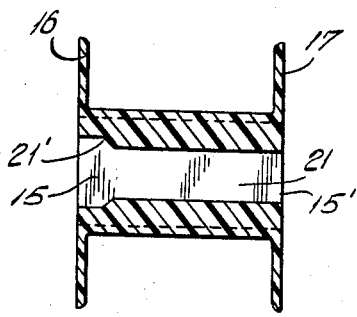
FIGURE 2 is a cross-sectional view of FIGURE 1 taken along the line 2—2 thereof.
Figure 3:
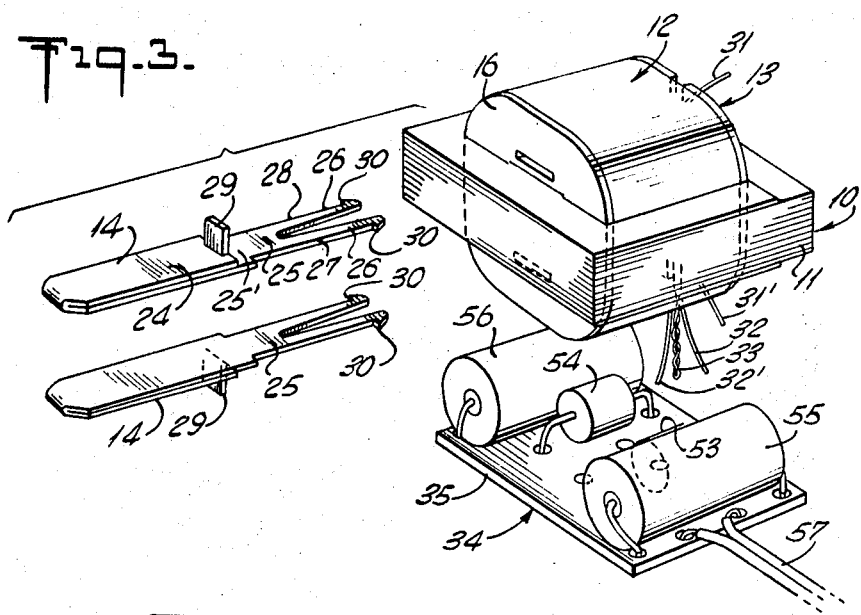
FIGURE 3 is an exploded perspective view of a power supply in accordance with the invention and showing the transformer and coil assembly preparatory to installation of the prongs for support of the transformer and attachment of the rectifying and filtering components.

Referring now to the drawings and more specifically to FIGURES 1 to 3, the transformer is generally denoted by the numeral 10 and includes a conventional magnetic core 11, a coil 12 wound on a coil form 13 and a pair of prongs 14 adapted to be inserted in openings 15 of the coil form 13.

The structure of the coil form 13 is shown more clearly in FIGURES 1 and 2 and comprises a pair of side walls 16 and 17 and a central tubular element 18 formed integrally with the side walls 16 and 17. The side walls 16 and 17 are provided with openings 19 having the same configuration and size as the opening 20 in the tubular member 18 so that the conventional E-shaped laminations of the magnetic core 11 can extend through the coil. The tubular portion 18 of the coil form or spool 13 is further provided with channels 21 on a pair of opposing sides thereof and which channels extend throughout the length of the tubular member 18 and terminate in the openings 15 in the side wall 16 and openings 15' in the side wall 17. The channels 21 in the instant embodiment of the invention are generally uniform in configuration throughout their lengths except that the portion of each channel adjoining the openings 15 has a widened section 21' to cooperate with the configuration of the prongs 14. In addition, the side wall 17 is provided with a pair of opposing slots 22 and 23 for accommodation of the lead wires from the windings 12.

The prongs 14, which are adapted to engage the channels 21, are preferably inserted after the coil form 13 has been wound and automatically lock in place in the coil form. While the prongs may take any suitable form, in the instant embodiment of the invention, they are intended for cooperation with a conventional electrical outlet and accordingly each prong has a forward portion 24 having a length sufficient to extend from the wall 16 of the coil form and beyond the transformer core 11 a distance sufficient to permit its firm engagement with a conventional electric outlet. The rear portion 25 of each prong is bifurcated to provide a pair of arms 26. The side edges of the prong portion 25 are recessed at 27 and 28 to provide a maximum width approximately equal to the width of the channel 21. The section 25' of the prong portion 25 is wider than the remainder of the prong portion 25 and is adapted to fit snugly in the widened portion 21' of the channel 21. Just forwardly of the section 25' is a tab 29 at substantially right angles to the prong which acts to limit the movement of the prong into the passage 21. The distance between the rear surface of the tab 29 and the shoulders 30 on the arms 26 is substantially equal to the total width of the coil form 13 so that when the prong is inserted into the passage 21 the tab 29 will rest against the side wall 16 and the shoulders 30 will engage the surface of the other side wall 17.

The arms 26 of each prong may be spread apart slightly so that when the shoulders emerge from the opening 15' the arms will automatically spring apart and thereby lock the prong in position. Either the tabs 29 or the outer ends of the arms 26 may be utilized as terminals for connection of the ends of the primary winding of the coil 12. In FIGURE 3, the lead wires from the primary winding are denoted by the numerals 31 and 31' and are preferably connected to one of the arms 26. The secondary winding has leads 32 and 32' and a centertap 33.

Figure 4:
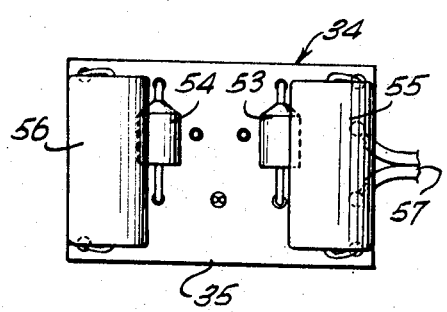
FIGURES 4 and 5 are top and bottom views of the rectifying and filtering components prior to connection with the transformer.
Figure 5:
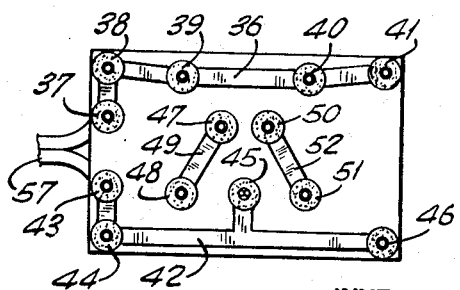

The rectifying assembly generally denoted by the numeral 34 is illustrated in FIGURES 4 and 5, while the circuit diagram is shown in FIGURE 10. This assembly includes a board of insulating material 35 having a plurality of conductors printed on one side thereof with suitable terminals for the attachment of the transformer leads and the necessary components for rectification and filtering. More specifically and with reference to FIGURE 5, the conductor 36 has terminals 37 through 41, while the conductor 42 has terminals 43 through 46. In the center of the board, a pair of terminals 47 and 48 are connected by a conductor 49, while the terminals 50 and 51 are connected by a conductor 52. A pair of rectifiers 53 and 54 are connected respectively between terminals 39, 48 and 40, 51 and the secondary leads 32 and 32' are connected to the terminals 47 and 50. The centertap 33 from the secondary on the transformer is connected to terminal 45. Condensers 55 and 56 are connected to terminals 38, 44 and 41, 46 respectively, and the output lead 57 is connected to the terminals 37 and 43. The numerals used in denoting the elements of FIGURE 5 are also used in FIGURE 10, and where a single connection is illustrated in FIGURE 10, it is identified by several numerals if the connection is accomplished by more than one terminal on the printed circuit board 35 shown in FIGURES 4 and 5.

The wired assembly illustrated and described in connection with FIGURE 3 is then inserted in a surrounding housing generally denoted by the numeral 58 with the cable extending through a slot 59 in one side wall. The cover plate 60 is provided with openings 61 for the accommodation of the prongs 14 and is snapped in place on the housing 58. If desired, suitable cushioning material 62 may be applied to one edge of the transformer core 11 to hold the transformer snugly within the housing 58. The cover 60 can be held in place on the housing 58 in any suitable manner, and in the instant embodiment of the invention, inwardly extending tabs 63 on the cover as shown in FIGURE 7 may be employed to cooperate with recesses 64 in the housing. The tabs 63 and the recesses 64 operate in the nature of snap latches and provide a secure attachment for the cover 60.

The cooperation of the prongs 14 with the coil form 13 is also shown in FIGURE 6 wherein it will be observed that the tab 29 on each prong and the offset end portions 30 on the ends of the arms 26 firmly latch the prongs in position on the coil form.

While only one embodiment of the invention has been illustrated and described, it is apparent that alterations, modifications and changes may be made without departing from the true scope and spirit thereof as defined by the appended claims.

What is claimed is:

1. In a transformer, a coil form having a pair of side walls and a tubular member connecting said side walls to form a spool for the retention of windings, channels extending through said side walls and the walls of said tubular member, and conductive prongs fixedly engaged in said channels and extending from one of said side walls, said prongs constituting supporting and energizing means for said transformer.

2. In a transformer according to claim 1 wherein each of said prongs comprises an elongated strip of conductive material, means spaced from one end thereof to engage one of said side walls of said coil form and means on said one end engaging the other of said side walls to hold the prong in place in its cooperating channel.

3. In a transformer, a coil form comprising an elongated tubular member including at least a large central axial opening extending therethrough and at least two spaced channels parallel to said opening, disk-like end walls secured to the ends of said member to form a spool, said end walls having openings registering with said central opening and said channels, and prongs carried in each channel and extending from at least one end wall, each of said prongs comprising an elongated strip of rigid conductive material, means spaced from one end thereof to engage one of said side walls of said coil form and means on said one end engaging the other of said side walls to hold the prong in place in its cooperating channel.

4. A coil form and prong assembly for a transformer having a magnetic core comprising a spool of insulating material having a central opening extending therethrough for the receipt of magnetic material forming part of the transformer core, prong receiving and holding means on said coil form and rigid elongated prongs of conductive material engaged in said prong receiving and holding means, said prongs extending from said coil form for supporting and energizing the completed transformer.

5. A coil form and prong assembly according to claim 4 wherein said prong receiving and holding means are openings extending through said spool with said insulating material completely surrounding the prong portions disposed within said openings.

6. In a power supply having a housing, a transformer in said housing adapted to be energized by alternating current at one voltage and producing alternating current at a lower voltage, wherein said transformer comprises a coil form of insulating material, at least two windings on said coil form, a core of magnetic material with at least part of said core extending through the coil form, prong receiving and engaging means in said coil form, rigid elongated prongs of conductive material in said prong receiving and holding means, said prongs extending through said housing for engagement with an electric outlet to support and energize said power supply and connections between one of said windings and said prongs.

7. A power supply comprising a housing, a transformer in said housing adapted to be energized by alternating current at one voltage and producing alternating current at a lower voltage, said transformer having a coil form of insulating material comprising an elongated tubular member having a central opening extending therethrough and passages formed in the walls thereof parallel to the axis of said member and a pair of side walls formed integrally with said tubular member, said side walls having openings registering with the said passages and the opening in said tubular member, primary and secondary windings on said coil form, a magnetic core with at least part of said core extending through said central opening, relatively rigid prongs engaging said passages and extending from said transformer and through said housing in substantially parallel relationship for engagement with an electric receptacle to support and energize the power supply and connections between said primary winding and said prongs, and a cable connected to said secondary winding and extending from said housing.

References Cited

UNITED STATES PATENTS

| | | | |
|---|---|---|---|
| 1,647,372 | 11/1927 | Pressley | 336—192 X |
| 1,659,062 | 2/1928 | Varley | 336—192 X |
| 1,741,265 | 12/1929 | Wappler | 336—92 |
| 2,955,238 | 10/1960 | Habegger | 336—192 X |
| 2,956,210 | 10/1960 | Yatsushiro | 336—105 X |
| 2,089,071 | 5/1963 | Hartwig | 310—47 X |
| 3,244,960 | 4/1966 | Stevens et al. | 321—8 |

FOREIGN PATENTS 93,597  7/1923  Austria.

JOHN F. COUCH, *Primary Examiner.*

W. H. BEHA, *Assistant Examiner.*